Feb. 4, 1964
L. A. WILLIAMS
3,120,482
APPARATUS FOR ELECTROLYTIC HOLE SINKING
Filed Nov. 16, 1959
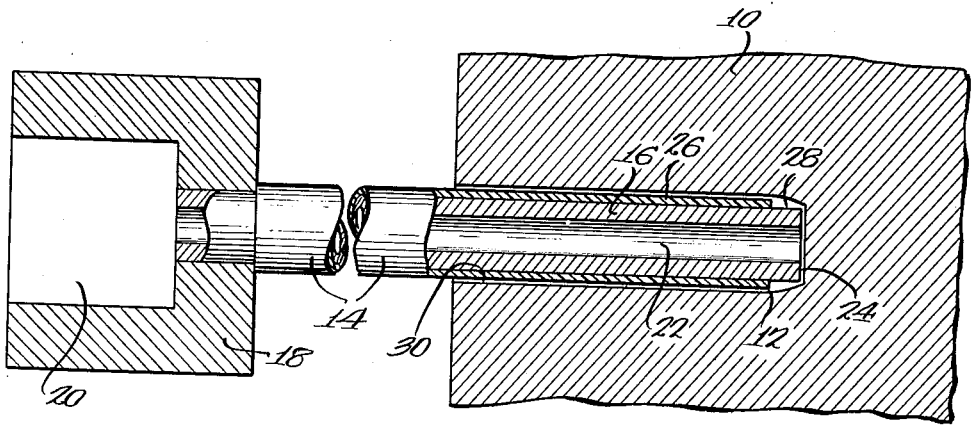
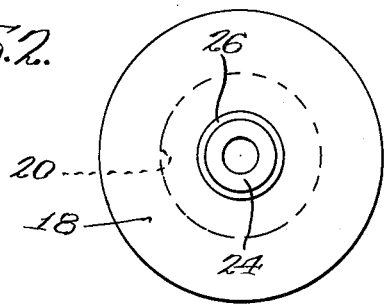
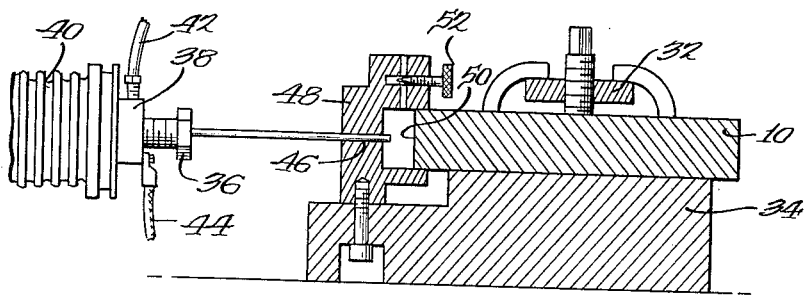
INVENTOR.
Lynn A. Williams
BY
Wupper, Gradolph & Love
Attys.

United States Patent Office 3,120,482
Patented Feb. 4, 1964

3,120,482
APPARATUS FOR ELECTROLYTIC HOLE SINKING
Lynn A. Williams, Winnetka, Ill., assignor to Anocut Engineering Company, Chicago, Ill., a corporation of Illinois
Filed Nov. 16, 1959, Ser. No. 853,194
8 Claims. (Cl. 204—224)

This invention relates to electrodes and related equipment for the electrolytic removal of work material for the production of cavities, holes and the like, and more particularly to an electrode which is especially adapted for the formation of very small holes of almost any reasonable depth.

One of the objects of the invention is to provide a novel electrolyzing electrode which is well adapted for sinking small, straight, uniform diameter holes and cavities, and which can be manufactured at low cost.

Another object is to provide an improved electrode of this character which gives a quite precise control over the side cutting action and thus prevents the inadvertent production of holes of uneven diameter.

A further object is to provide a novel electrode which is well adapted for the production of deep, small diameter, untapered holes of excellent surface finish.

Other objects and advantages will become apparent from the following description of a preferred embodiment of the invention which is illustrated in the accompanying drawings.

In the drawings, in which similar characters of reference refer to similar parts throughout the several views:

FIG. 1 is a side view of a small diameter electrode embodying features of the invention, drawn to large scale and shown associated with a workpiece;

FIG. 2 is an end view of the electrode of FIG. 1; and

FIG. 3 is a somewhat diagrammatic side view of apparatus showing the electrode of FIG. 1 as associated with related equipment and a representative workpiece.

In my copending patent application Serial No. 772,960, filed November 10, 1958, now Patent No. 3,058,895, for "Electrolytic Shaping," I have described and illustrated in considerable detail apparatus for electrolytic hole sinking and for related applications. In general, such arrangements provide for the support of a workpiece and an electrode in a configuration such that the electrode can be advanced toward and into the workpiece at a controlled rate as material is electrolytically removed from the work. An electrolyte is supplied under pressure to the interface between the electrode working end and the work by way of a passage through the electrode, and the work and electrode are connected into a low potential, high amperage capacity, direct current circuit, such that the electrode is cathodic relative to the work.

In the referred to copending application, an electrode is described which comprises a tubular section with the end of the tube flared outwardly or provided with a ring to form a lip of larger transverse dimension than the tube. This lip provides the working electrode surface, such that the hole formed has a transverse dimension larger than the tube size, thus providing clearance for a layer of insulation on the tube exterior sidewall above the lip.

An electrode of this character is satisfactory for most purposes, but has serious disadvantages from the manufacturing standpoint when it is attempted to incorporate this structure in a very small elecrode, one for making .050" diameter holes, for instance. Furthermore, lipped electrodes of such small size are extremely fragile and the passage through the center becomes inefficiently small and is too readily plugged by small, solid particles circulating with the electrolyte.

The present invention provides an electrode which, although it is adaptable to wider application, is specifically intended for solving the problem of forming small holes—smaller than one-tenth inch, for instance—even when such holes are deep.

In FIG. 1 a workpiece is indicated at 10. As shown, a hole 12 is being formed therein by an electrode 14. This electrode comprises a length of conductive metal tubing 16 having one end soldered in a bore of a fitting 18 which is shaped to be secured in the electrode holder of the drive head of an electrolytic hole sinking machine (FIG. 3). The fitting 18 has a recess 20 in communication with the passage 22 through the tube 16, such that electrolyte supplied to the fitting recess flows to the working end 24 of the electrode by way of the central passage.

The exterior side wall of the tube is coated with a thin but impervious layer of insulating material 26 throughout its working length excepting that a short section 28 of the tube sidewall contiguous to the working end 24 is exposed.

The insulating material should be substantially unaffected by the electrolyte and have good adhesion to the metal tube and good film strength. For this purpose I have found that ceramic coatings and some commercially available epoxy resins are satisfactory. Although there is an advantage in having the coating as thin as possible, as a practical matter, coatings from .003" to .007" have proved to be the most satisfactory in service.

In a typical application, holes 30 having a diameter of .073" were formed in a high temperature, hard alloy, known as "Udimet 500" under the following conditions, "Udimet 500" having the following nominal composition:

| | Percent |
|---|---|
| Carbon | 0.12 |
| Chromium | 20.0 |
| Molybdenum | 4.0 |
| Cobalt | 10.0 |
| Titanium | 3.0 |
| Aluminum | 2.75 |
| Iron | 2.0 |
| Manganese | 1.0 |
| Silicon | 0.25 |
| Nickel, balance. | |

The electrode metal tube had a diameter of .058" and a wall thickness of about .015". The tube was exteriorly insulated with an epoxy resin to a total diameter of .068", and the amount of tip exposure beyond the coating was .025". This exposure was provided in this instance by turning off the insulation at the end in a lathe to the desired dimension.

The electrolyte used consisted of the following in fifteen gallons of water:

| | Pounds |
|---|---|
| Potassium chloride | 15 |
| Potassium nitrate | 5 |
| Potassium citrate | 5 |
| Rochelle salts | 5 |

Other electrolytes can, of course, be used, and those interested are referred to the previously mentioned copending application for a fuller explanation.

The electrolyte was supplied to the electrode at a temperature of 120° F. and a pressure of about 150 pounds per square inch. The electrolyzing current was 10 to 15 amperes at a potential of 11 volts. Under these conditions the electrode was advanced into the work at a rate of .102" per minute.

In another typical application, holes .050" in diameter were made with an electrode formed of tubing having an outside diameter of .035" and a wall thickness of about .010". The tubing was insulated as described above.

By the use of such electrodes and accessory epuipment to be described presently, it is easily possible to form straight, substantially untapered holes seven or eight inches deep.

As is shown in FIG. 1, the metal of the workpiece is electrolytically eroded ahead of the electrode so as to form a hole which is initially slightly larger than the electrode tip. As the tip enters this hole, electrolytic action continues along the side of the electrode, so that the hole becomes progressively larger or tapered. This tapering is not at a constant rate, however, since as the current path becomes longer, the erosive rate becomes progressively less. As a hole portion approaches it final desired diameter—in the above example, about .0025″ larger all around than the insulating layer—it passes the leading edge of the insulation 26 and thereafter the current path lengthens so rapidly that erosive side action substantially stops. This stoppage of electrolytic action is aided by a tendency of the liquid to bubble after it passes the end of the electrode. Holes seven or eight inches deep are, therefore, not appreciably larger at the entry than at the bottom, although sometimes there will be a slight bell-mouthing for about .050″ at the entry.

Under many circumstances, particularly where the electrodes are long and thin, I prefer to use such electrodes in an organization similar to that illustrated diagrammatically in FIG. 3.

Here the workpiece 10 is shown as fixed as by a clamp 32 to a stationary member 34 of a machine. If desired, this member may be a positioning device which will enable the work to be oriented as desired after clamping. The electrode 14 is secured with its head fitting 18 in the electrode holder 36 of a drive head 38. This drive head is at the end of a screw drive advanced ram enclosed for its protection within a bellows 40. The ram mechanism, which may be of any suitable type, is such that the drive head can be advanced at any selected rate.

By means of internal passages (not shown), electrolyte is supplied under pressure from a hose 42 to the recess 20 of the electrode head 18, and thence to the electrode tip at 24 by way of the electrode central passage 22.

The negative side of the electrolyzing power supply, represented by the cable 44, is connected to the drive head 36 and thus to the electrode. The other side of this circuit is grounded and is therefore connected to the work 10.

As previously mentioned, the electrode 14 will, in many instances, be quite fragile and it is therefore piloted close to the entering surface of the work. This is accomplished by passing the electrode through a close fitting orifice 46 in a bracket or housing member 48. The piloting orifice is directly in alignment with the hole position and supports the electrode as close to the work face as is practicable. Preferably the housing or bracket 48 is sealed against the work face so as to provide a chamber 50 around the electrode where it enters the work. This chamber may be vented through a needle valve 52 which can be used to regulate the electrolyte flow from the chamber 50, and hence the pressure therein, and this feature may be of value not only with small electrodes but also with larger ones. This is done because I have found that if the size of gas and vapor bubbles which form in the electrolyte is held down by pressure until after the electrolyte leaves the work gap, the hole sinking operation may proceed more rapidly and at higher efficiency and with better surface finish as is explained in greater detail in both of the referred to copending applications. Also this reduces the required width of exposure at the tip, as will appear.

When electrolyte is pumped through the electrodes under the pressures contemplated, there is a tendency for the electrodes to vibrate or flutter, to some extent at least, in a random fashion. The piloting arrangement described above largely eliminates this effect as the electrode enters the work, and thereafter the layer of insulation upon the electrode side wall provides additional control as the electrode penetrates deeper. Note in the specific example given above that the clearance between the insulating layer and the hole sidewall is only about .0025″. It has been found that this vibration or flutter phenomenon is not troublesome if it is controlled so as to be kept quite small, as in the example described above. In general, the clearance between the insulation and the hole wall should, with small holes, be within the range of .001″ to .003″ for best results. Excessive amplitude of vibration of the electrode may cause the exposed end to short against the work at the bottom of the hole, which, as is apparent from FIG. 1, is only slightly larger than the electrode tip as is indicated at 25, the hole not reaching its full diameter until somewhat above this position.

A number of interrelated factors have to be taken into account in determining the parameters of the electrode of this invention, and at least two of these are involved in the method of operation, so that the invention in this sense contemplates both the nature of the electrode and the method in which it is used.

Ordinarily, it is desirable, of course, to be able to advance the electrode through the work at maximum speed, and preferably this should be done with relatively low applied voltage for purposes of economy, both in electric power consumption and in the cost of the electrical apparatus. The rate of penetration is proportional to the current density which passes between the electrode tip and the anodic workpiece, assuming that the current efficiency is constant, as has been found to be the case over a wide range of operating speeds. The relationship of current density to penetration rate for a wide variety of steel materials—including stainless steel; nickel base, high temperature alloys; and cobalt-base, high temperature alloys—has been found to be expressed by the relationship:

$$PR = \frac{CD}{10,000}$$

where PR is the penetration rate in inches per minute and CD is the current density in amperes per square inch.

It has been found that, by using a pressure in the electrolyte of the order of 150 pounds per square inch to 180 or 200 pounds per square inch and with a voltage of ten to eleven volts, current densities may be obtained for the kinds of metals indicated above ranging from 1500 amperes per square inch to 6000 amperes per square inch, and there is reason to believe that under proper conditions even higher current densities may be achieved. Assuming, however, for purposes of illustration, that a current density of 3000 amperes per square inch is attainable, we may then expect a penetration rate of .300″ per minute.

To prevent sidewall erosion from unwanted electrolytic action, it is necessary, as has already been explained, to insulate the outside wall of the electrode tube, and, where the tube has an inner diameter greater than about 1/8″ to about 3/16″, it is also desirable where a through hole is to be made to insulate the interior wall of the electrode tube. I have found that it is desirable to keep the insulating layer to a thickness below .010″ and, preferably, to a thickness of the order of .003″ to .005″, for, subject only to obtaining a practical level of durability, the thinner the insulating coating the better the results which can be obtained. With a finite thickness of insulating material, it is, of course, necessary to assure that there be sufficient side action to enlarge the hole by an amount sufficient not only to permit the tube of the electrode to enter the hole which is being formed, but also to provide a gap or opening through which electrolyte may escape from the work area. In practice, it has been found that a clearance of the order of .002″ between the hole and the mean dimension of the exterior of the electrode is a satisfactory clearance.

I refer to the mean dimension of the electrode because, in practice, the insulating coating will have slight irregularities, and these, in fact, have some advantage, for, while the nominal clearance may be, say, .002″, there will be points or areas where the insulating material, being somewhat bumpy, will be closer than this to the sidewall of the hole being formed and will thereby restrict the amplitude of vibration to a path less than the nominal clearance of .002″. Thus, the use of slightly knobby or bumpy coating should be regarded as a part of this invention, for the limitation of lateral vibration is an important factor in achieving optimum speed. Also, as a practical manner, particularly with small electrodes, the self-piloting action is important to achieve a reasonably straight hole, and here, also, the limitation of sideward motion achieved by the combination of a close nominal clearance and some knobbiness on the surface of the insulation is important.

As to the amount of uninsulated or exposed portion near the working tip of the electrode, this will be controlled by the following three factors:

First, the speed of advance or penetration affects the requirement as to the degree of exposure at the tip. The slower the rate of advance, the more time is provided for side action, and, accordingly, the narrower the exposed portion may be.

Second, thickness of the insulation has to be given account, as the thicker the layer of insulation, the more tip exposure is required to produce a sufficient amount of side action to provide clearance for the insulated portion of the electrode.

Third, the greater the absolute pressure in the electrolyte at the exposed portion of the tip, the narrower the exposed portion may be. This is for the reason that a higher pressure in the electrolyte reduces the size of the gas bubbles in the electrolyte, thereby increasing its effective density and, consequently, its effectiveness in conducting current for electrolytic removal. Here, the adjustment of the back pressure or exit pressure by means of the needle valve 52 is significant.

While other factors, such as the input temperature of the electrolyte, the degree of heating within the electrode tube, the nature of the electrolyte itself, etc., all enter into any absolute equation, it has not yet been possible to make a quantitative formulation which interrelates all of these factors. Enough is known, however, to show that the exposure at the tip should be at least equal to the thickness of the insulating layer, and that the insulating layer itself should be not greater than .010″ for best results.

Where a back pressure resisting the exit of electrolyte is maintained at several atmospheres, then a good penetration rate may be obtained with a very narrow exposure, which, in some cases, may be as little as one-half the thickness of the layer of insulation. This is particularly evident where the interior wall of the electrode is insulated with a layer having a thickness of .003 to .005 inch. Because the electrolyte is under full pressure and because no electrolytic action, and consequently no bubbling, occurs until the electrolyte comes to the working end of the electrode, it has been found that no uninsulated area whatsoever is necessary to provide clearance between the interior wall of the electrode and the core of work material which projects up within it after the electrode advances. I believe that this is because there is sufficient electrolytic conduction from the exposed frontal face of the electrode back through the solid electrolyte and radially inwardly to remove sufficient work material to assure clearance.

The same thing might be true of the outside surface if electrolyte were introduced around the exterior of the electrode and allowed to exit through the central bore of the electrode, but, in either case, to obtain maximum penetration rate the insulating layer must be very thin, of the order of .003″ to .005″.

It is usually far more convenient to pump electrolyte through the electrode, and this means that, as the electrolyte passes from the interior bore under the frontal face of the electrode tip, some amount of bubbling will begin, and, in consequence, the electrolytic action of the outside wall of the hole being formed will be diminished. This diminution of electrolytic side action is substantial enough so that, if there is no restriction on the exit of electrolyte, it is necessary to leave an exposure at the tip of the electrode of the order of .020″ to .030″ even though the thickness of the insulating layer is quite thin.

Thus, the amount of exposure may range from virtually zero when the insulation is thin and where at least several atmospheres of electrolyte pressure is maintained where the desired side action is to occur on up to an exposure of .030″ to as much as .060″ where the insulating layer is thicker, say .010″, and where the electrolyte is not under any pressure except normal atmospheric pressure.

In order to get the desired results, it is necessary, then, to interrelate the area of exposure at the tip to the rate of advance and, also, to the pressure in the electrolyte, so that, as the electrode advances, there is an adequate clearance which, however, should be not too great. The clearance I refer to as being optimum at about .002″ may range from .001″ to as much as .005″ with reasonably satisfactory results.

A part of the method of operation consists in adjusting the rate of advance upwardly until the desired clearance is obtained. It is a curious fact that under some conditions a rate of feed which is too slow will actually prevent good and reliable operation, for too slow a feed will cause side action, even with no exposure at all, great enough to enlarge the hole to such a degree that the electrode may begin to vibrate or move laterally and cause short-circuiting. This occurs particularly with small electrodes which cannot practically be insulated on the interior, so that, while there will be no short-circuiting under such conditions against the outer wall of the electrode, there may be short-circuiting between the inner lip of the working tip of the electrode and the small cone of material which ordinarily projects up into the bore.

Although this invention has ben described as having particular utility when applied to small electrodes, it will be understood that larger electrodes may also be made in this manner. For instance, the invention has been found to be advantageous when applied to electrodes of quite irregular shape where flaring the end or attaching a flange of precise shape is somewhat difficult even with large electrodes.

From the above description of a preferred embodiment of my invention, it will be apparent that variations in the structure or procedure may be made without departing from the scope of the invention, and therefore that the scope of the invention is to be measured from the scope of the following claims.

Having described my invention, what I claim as new and useful and desire to secure by Letters Patent is:

1. An electrode for electrolytic hole sinking comprising a tube of substantially uniform transverse section, means attached to one end of said tube for supporting said tube and supplying electrolyte under pressure thereto, a layer of insulating material fixedly and intimately covering a substantial portion of said tube intended to extend into the hole, that portion contiguous to the free end of said tube being exposed, said exposed portion extending backwardly from the free end by a distance which is within the range of from five thousandths to thirty thousandths of an inch, said layer of insulating material being no thicker than the axial length of said exposed tube portion.

2. An electrode for electrolytic hole sinking comprising a length of conductive tubing of substantially uniform transverse section, means attached to one end of said tube for supporting said tube and supplying electrolyte under pressure thereto, a layer of insulating material of from three to five thousandths of an inch thick fixedly and intimately covering a substantial portion of said tube intended to extend into the hole, that portion contiguous to the free end of said tube being exposed, said exposed portion extending backwardly from the free end by a distance which is within the range of from five thousandths to thirty thousandths of an inch.

3. Electrolytic hole sinking apparatus comprising a small diameter conductive tube of substantially uniform transverse section, a thin layer of insulation fixedly and intimately covering a substantial portion of said tube leaving an exposed portion at one end thereof, said exposed portion extending inwardly from said end of said tube a distance substantially greater than the thickness of said insulation layer but not substantially greater than thirty thousandths of an inch, means secured to the other end of said tube for supporting said tube and for supplying electrolyte under greatly superatmospheric pressure thereto, the last said means also acting to advance said tube in an endwise direction toward and into a workpiece, means secured rigidly with respect to said workpiece for preventing transverse movement of said tube at a position close to said workpiece as said tube is advanced, and means providing a chamber around said tube where said tube enters said workpiece, said chamber communicating with the face of said workpiece where said tube enters said workpiece, said chamber forming means providing a restricted escape path for electrolyte under pressure in said chamber whereby electrolyte in the spaces between said electrode and the workpiece will be maintained under superatmospheric pressure.

4. An electrode for electrolytic hole sinking comprising a length of conductive tubing of substantially uniform transverse section, means attached to one end of said tube for supporting said tube and supplying electrolyte under pressure thereto, a layer of insulating material of from three to five thousandths of an inch thick fixedly and intimately covering a substantial portion of said tube intended to extend into the hole, that portion contiguous to the free end of said tube being exposed, said exposed portion extending backwardly from the free end by an amount which is substantially greater than the thickness of said coating but not substantially greater than thirty thousandths of an inch.

5. An electrode for electrolytic hole sinking comprising a length of conductive tubing of substantially uniform transverse section, means attached to one end of said tube for supporting said tube and supplying electrolyte under pressure thereto, a layer of insulating material of from two to ten thousandths of an inch thick fixedly and intimately covering a substantial portion of said tube intended to extend into the hole, that portion contiguous to the free end of said tube being exposed, said exposed portion extending backwardly from the free end by an amount which is substantially greater than the thickness of said coating, but not substantially greater than thirty thousandths of an inch.

6. An electrode for electrolytic hole sinking comprising a length of conductive tubing of substantially uniform transverse section, means attached to one end of said tube for supporting said tube and supplying electrolyte under pressure thereto, a layer of impervious insulating material of not over ten thousandths of an inch fixedly and intimately covering a substantial portion of said tube intended to extend into the hole, that portion contiguous to the free end of said tube being exposed, said exposed portion extending backwardly from the free end by an amount which is substantially greater than the thickness of said coating but not more than thirty thousandths of an inch.

7. Apparatus for electrolytically shaping a conductive and electrochemically erosive workpiece by an electrolyzing current in the presence of an electrolyte, including in combination, a holder for the workpiece, means forming a chamber enclosing at least that face of the workpiece to be shaped and having an opening thereinto, an electrically conductive tubular electrode having a conductive working face slidably projecting into said chamber through said opening in sealing relationship thereto, means mounting said electrode, means connected to said electrode mounting means for moving said electrode toward the workpiece, means for flowing an electrolyte under greatly superatmospheric pressure through the gap between the workpiece and said electrode and to maintain said chamber and said gap filled with electrolyte under superatmospheric pressure, and a restrictive outlet from said chamber.

8. Apparatus for electrolytically shaping a conductive and electrochemically erosive workpiece by an electrolyzing current in the presence of an electrolyte, including in combination, a holder for the workpiece, housing means enclosing at least a portion of the workpiece, forming a chamber thereabout, and having an opening thereinto, an electrically conductive tubular electrode of small diameter having a conductive working face slidably projecting into said chamber through said housing opening in sealing relationship thereto, means mounting said electrode, positive drive means connected to said electrode mounting means for moving said electrode toward the workpiece, a source of electrolyte under greatly superatmospheric pressure, means connecting said electrolyte source to flow electrolyte under superatmospheric pressure through the gap between the workpiece and said electrode and into said chamber, and a restrictive electrolyte outlet means from said chamber.

References Cited in the file of this patent

UNITED STATES PATENTS

| 2,715,172 | Larkins | Aug. 9, 1955 |
| 2,739,935 | Kehl et al. | Mar. 27, 1956 |

FOREIGN PATENTS

| 335,003 | Great Britain | Sept. 18, 1930 |

OTHER REFERENCES

Bleiweis et al.: "Electrochemical Removal of Broken Tools, Metals and Alloys," Nov. 1943, pp. 1075 to 1080. (Copy in Scientific Library.)

Dedication 3,120,482.—*Lynn A. Williams*, Winnetka, Ill. APPARATUS FOR ELECTROLYTIC HOLE SINKING. Patent dated Feb. 4, 1964. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]